(12) United States Patent
Huang et al.

(10) Patent No.: US 11,812,152 B2
(45) Date of Patent: Nov. 7, 2023

(54) METHOD AND APPARATUS FOR CONTROLLING VIDEO FRAME IMAGE IN LIVE CLASSROOM

(71) Applicant: Beijing Ambow Shengying Education and Technology Co., Ltd., Beijing (CN)

(72) Inventors: Jin Huang, Beijing (CN); Gang Huang, Beijing (CN); Kesheng Wang, Beijing (CN); Yin Yao, Beijing (CN); Qiaoling Xu, Beijing (CN)

(73) Assignee: BEIJING AMBOW SHENGYING EDUCATION AND TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 17/388,084

(22) Filed: Jul. 29, 2021

(65) Prior Publication Data

US 2022/0337755 A1 Oct. 20, 2022

(30) Foreign Application Priority Data

Apr. 20, 2021 (CN) .......................... 202110424383.5

(51) Int. Cl.
*H04N 23/695* (2023.01)
*G06T 7/80* (2017.01)
*G06T 7/73* (2017.01)
*G06T 7/13* (2017.01)
*G09B 5/06* (2006.01)
*H04N 23/611* (2023.01)

(52) U.S. Cl.
CPC ............ *H04N 23/695* (2023.01); *G06T 7/13* (2017.01); *G06T 7/73* (2017.01); *G06T 7/80* (2017.01);
(Continued)

(58) Field of Classification Search
CPC .... H04N 23/695; H04N 23/611; H04N 23/60; H04N 21/2187; H04N 21/431;
(Continued)

(56) References Cited

U.S. PATENT DOCUMENTS

2013/0265420 A1* 10/2013 Adachi .................. G06V 20/52
348/143
2019/0244050 A1* 8/2019 Lin ........................ G06V 10/40
(Continued)

FOREIGN PATENT DOCUMENTS

CN 106603912 A 4/2017
CN 110650368 A 1/2020
(Continued)

OTHER PUBLICATIONS

Office Action dated Mar. 21, 2022, in corresponding Chinese patent Application No. 202110424383.5, 15 pages.
(Continued)

*Primary Examiner* — Nay A Maung
*Assistant Examiner* — Vaisali Rao Koppolu
(74) *Attorney, Agent, or Firm* — XSENSUS LLP (57) ABSTRACT

A method and an apparatus for controlling a video frame image in a live classroom, and a computer readable storage medium and an electronic device are provided. The method includes: acquiring image information of a target person in the video frame image; determining a plurality of detection points according to the image information; determining distribution information of the plurality of detection points based on relationship between the plurality of detection points and a preset first area; determining adjustment information of a camera based on the distribution information and camera parameters; and adjusting the camera according to the adjustment information, so that at least a part of the image information of the target person in the video frame image is located in a preset second area, wherein the second area is located in the first area.

8 Claims, 7 Drawing Sheets

(52) U.S. Cl.
CPC ........... *G09B 5/065* (2013.01); *H04N 23/611* (2023.01); *G06T 2207/10016* (2013.01); *G06T 2207/30196* (2013.01); *G06T 2207/30244* (2013.01)

(58) Field of Classification Search
CPC ....... H04N 21/44008; G06T 7/13; G06T 7/73; G06T 7/80; G06T 2207/10016; G06T 2207/30196; G06T 2207/30244; G09B 5/065

See application file for complete search history.

(56) References Cited

U.S. PATENT DOCUMENTS

2019/0304071 A1* 10/2019 Kitajima .............. H04N 13/271
2020/0258192 A1* 8/2020 Li ........................ G06T 3/0012
2021/0304436 A1* 9/2021 Takemoto ................. G06T 7/74
2022/0358679 A1* 11/2022 Chen ......................... G06T 7/73
2023/0021863 A1* 1/2023 Wang ........................ G06T 7/20

FOREIGN PATENT DOCUMENTS

| | | | |
|---|---|---|---|
| CN | 111083518 A | | 4/2020 |
| CN | 111669508 A | * | 9/2020 |
| CN | 111669508 A | | 9/2020 |
| CN | 112733619 A | * | 4/2021 |
| WO | WO-2015178001 A1 | * | 11/2015 ............... G06T 7/00 |

OTHER PUBLICATIONS

Office Action dated Apr. 28, 2022, in corresponding Taiwanese patent Application No. 110127254, 9 pages.

* cited by examiner

METHOD AND APPARATUS FOR CONTROLLING VIDEO FRAME IMAGE IN LIVE CLASSROOM

CROSS-REFERENCE TO RELATED APPLICATION

This application claims priority from Chinese Application No. 202110424383.5, filed on Apr. 20, 2021, the contents of which are incorporated by reference herein in its entirety.

TECHNICAL FIELD

The present disclosure relates to the field of image processing, and in particular to a method and an apparatus for controlling a video frame image in a live classroom, and a computer readable storage medium, and an electronic device.

BACKGROUND

Teaching interaction is an important teaching method. That is, the educational activity is regarded as a kind of interaction and communication based on teaching content between teachers and students, and between students, and a teaching process is regarded as a dynamic development process, in which teaching and learning are unified and effect and activity interactive. In the teaching process, it is a kind of teaching method to improve the teaching effect by adjusting a relationship between a teacher and a student and interaction thereof to produce teaching interaction.

With the development of computer technology, Internet-based live teaching begins to emerge, and a panoramic intelligent blackboard combined with multimedia technology also emerged with the live teaching. In live teaching, a camera is usually used to realize Internet-based remote teaching.

SUMMARY

The content of the summary is provided to introduce inventive concepts in a brief form, and these concepts will be described in detail in following specific embodiments. The content of the summary is not intended to identify key features or essential features of the technical solution that is required to be protected, nor is it intended to be used to limit the scope of the technical solution that is required to be protected.

The purpose of the present disclosure is to provide a method and an apparatus for controlling a video frame image in a live classroom, and a computer readable storage medium, and an electronic device, which can solve at least one technical problem mentioned above. Specific solutions are as follows:

According to specific embodiments of the present disclosure, the present disclosure provides a method for controlling a video frame image in a live classroom, comprising:
acquiring image information of a target person in the video frame image;
determining a plurality of detection points according to the image information;
determining distribution information of the plurality of detection points based on relationship between the plurality of detection points and a preset first area;
determining adjustment information of a camera based on the distribution information and camera parameters; and
adjusting the camera according to the adjustment information, so that at least a part of the image information of the target person in the video frame image is located in a preset second area, wherein the second area is located in the first area.

Optionally, the determining a plurality of detection points according to the image information comprises:
acquiring an image contour line of the target person according to the image information; and
determining the plurality of detection points based on the image contour line.

Optionally, the determining the plurality of detection points based on the image contour line comprises:
determining intersections of the image contour line and a plurality of parallel lines as the plurality of detection points, wherein the plurality of parallel lines are preset.

Optionally, the distribution information comprises a first number of the detection points located on the left side of the first area in a horizontal direction, and a second number of the detection points located on the right side of the first area in the horizontal direction;
the adjustment information comprises an adjustment direction; and
the determining adjustment information of the camera based on the distribution information and camera parameters comprises:
comparing the first number and the second number to determine the adjustment direction.

Optionally, the comparing the first number and the second number to determine the adjustment direction comprises:
in response to the first number being greater than the second number, and difference between the first number and the second number being greater than a preset adjustment threshold, it is determined that the adjustment direction is a left-side direction, wherein the adjustment threshold is greater than 0;
in response to the first number being less than the second number, and difference between the second number and the first number being greater than the adjustment threshold, it is determined that the adjustment direction is a right-side direction.

Optionally, the distribution information further comprises a position of a first specific detection point and a position of a second specific detection point, wherein the first specific detection point is the leftmost detection point in the horizontal direction among the plurality of detection points, the second specific detection point is the rightmost detection point in the horizontal direction among the plurality of detection points, and the adjustment information further comprises an adjustment angle, and the camera parameters comprise an angle of view of the camera in the horizontal direction;
the determining adjustment information of the camera based on the distribution information and camera parameters comprises:
acquiring an intermediate position between the first specific detection point and the second specific detection point in the video frame image, wherein a distance between the intermediate position and the first specific detection point in the horizontal direction is equal to a distance between the intermediate position and the second specific detection point in the horizontal direction;
calculating a first distance between a center position of the second area and the intermediate position in the horizontal direction; and acquiring the adjustment angle based on the first distance, a width of the video frame image, and the angle of view of the camera in the horizontal direction.

Optionally, a center position of at least one of the first area and the second area is located at a center position of the video frame image.

According to specific embodiments of the present disclosure, the present disclosure provides an apparatus for controlling a video frame image in a live classroom, comprising:
  an image acquisition component configured to acquire image information of a target person in the video frame image;
  a detection point determination component configured to determine a plurality of detection points according to the image information;
  a distribution determination component configured to determine distribution information of the plurality of detection points based on relationship between the plurality of detection points and a preset first area;
  an information determination component configured to determine adjustment information of a camera based on the distribution information and camera parameters; and
  an adjustment component configured to adjust the camera according to the adjustment information, so that at least a part of the image information of the target person in the video frame image is located in a preset second area, wherein the second area is located in the first area.

According to specific embodiments of the present disclosure, the present disclosure provides a computer readable storage medium having a computer program stored thereon, wherein the program is executed by a processor to implement the method according to the above embodiments.

According to specific embodiments of the present disclosure, the present disclosure provides an electronic device, comprising:
  one or more processors;
  a storage device configured to store one or more programs, and when the one or more programs are executed by the one or more processors, the one or more processors implement the method according to the above embodiments.

Compared with related technologies, the solutions of the embodiments of the present disclosure mentioned above have at least the following beneficial effects:

The present disclosure provides a method and an apparatus for controlling video frame images in a live classroom, a computer-readable storage medium, and electronic device. The present disclosure sets detection points in the image information of the target person in the video frame image, determines the distribution information of the plurality of detection points through the relationship between the detection points and the preset first area, and then uses the distribution information of the detection points and the camera parameter to generate adjustment information. This ensures that the image information of the target person has an adjustment redundancy suitable for the user's habits in the video frame image, and avoids the visual discomfort caused by frequent camera adjustments.

BRIEF DESCRIPTION OF THE DRAWINGS

The above and other features, advantages, and aspects of the embodiments of the present disclosure will become more apparent in conjunction with accompanying drawings and with reference to following specific implementations. Throughout the drawings, the same or similar reference number indicates the same or similar elements. It should be understood that the drawings are illustrative, and parts and elements are not necessarily drawn to scale. In the drawings.

DETAILED DESCRIPTION OF EMBODIMENTS

Hereinafter, embodiments of the present disclosure will be described in more detail with reference to the accompanying drawings. Although some embodiments of the present disclosure are shown in the drawings, it should be understood that the present disclosure can be implemented in various forms, and should not be construed as being limited to the embodiments set forth herein. On the contrary, these embodiments are provided to have a more thorough and complete understanding of the present disclosure. It should be understood that the drawings and embodiments of the present disclosure are only used for exemplary purposes, and are not used to limit the protection scope of the present disclosure.

It should be understood that various steps recorded in method embodiments of the present disclosure may be performed in a different order, and/or performed in parallel. In addition, method implementations may include additional steps and/or omit to perform some illustrated steps. The scope of the present disclosure is not limited in this respect.

The term "include" and its variants as used herein are open-ended "include", that is, "include but not limited to". The term "based on" means "based at least in part on". The term "one embodiment" means "at least one embodiment". The term "another embodiment" means "at least one additional embodiment". The term "some embodiments" means "at least some embodiments." Related definitions of other terms will be given in the following description.

It should be noted that concepts of "first" and "second" mentioned in the present disclosure are only used to distinguish different apparatus, modules or units, and are not used to limit an order of functions performed by these apparatus, modules or units, or relationship of interdependence.

It should be noted that modifications by "a" and "a plurality of" mentioned in the present disclosure are illustrative and not restrictive, and those skilled in the art should understand that unless it is otherwise indicated clearly in the context, they should be understood as "one or multiple".

The names of messages or information exchanged between multiple apparatus in the embodiments of the present disclosure are only used for illustrative purposes, and are not used to limit the scope of these messages or information.

Teaching interaction is an important teaching method. That is, the educational activity is regarded as a kind of interaction and communication based on teaching content between teachers and students, and between students, and a teaching process is regarded as a dynamic development process, in which teaching and learning are unified and effect and activity interactive. In the teaching process, it is a kind of teaching method to improve the teaching effect by adjusting a relationship between a teacher and a student and interaction thereof to produce teaching interaction.

Figure 1:
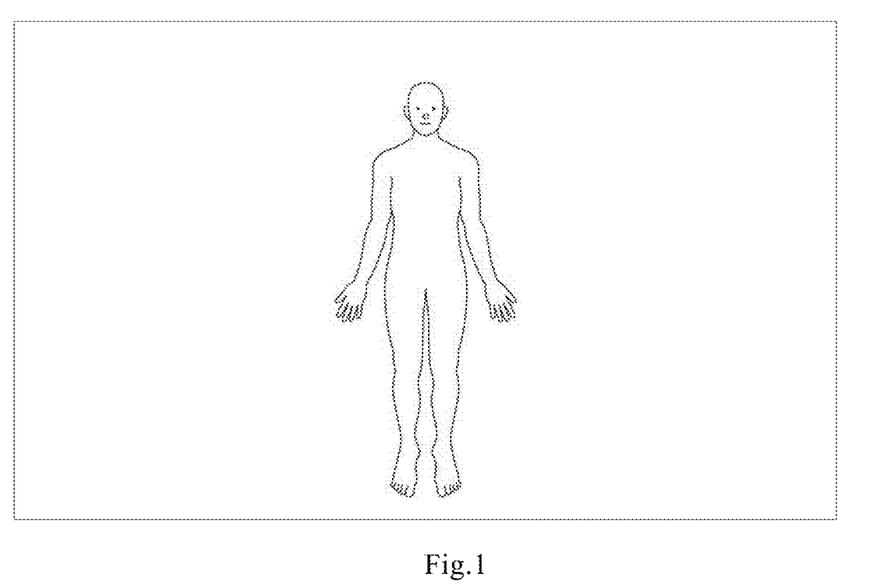
FIG. 1 shows a video frame image in a live classroom according to embodiments of the present disclosure.

With the development of computer technology, Internet-based live teaching begins to emerge. For example, a video of the teacher is collected in the live classroom through a camera (that is, a teaching video is composed of a plurality of video frame images as shown in FIG. 1), and the teaching video is transmitted to terminals participating in the live teaching through the Internet, so that images of persons in the live teaching are closely integrated with teaching content, which helps participants in the live teaching to overcome the sense of distance and enhance the sense of scene, and the interest of teaching is increased.

In some embodiments, in the live classroom scene, when the teacher is focused through the camera, a shooting angle of the camera needs to be adjusted according to changes in a position of the teacher in the live classroom scene, so that a positioning coordinate point of the whole body image of the teacher is placed on a preset coordinate point in the video frame image. However, when a posture of the teacher changes, the positioning coordinate point also changes. When the positioning coordinate point frequently changes slightly, the angle of the camera is caused to be frequently adjusted, and collected video frame images are in a jitter state. Visually, it is easy to make users watching the live teaching feel dizzy.

In order to overcome above-mentioned problems, the present disclosure provides a method and an apparatus for controlling a video frame image in a live classroom, and a computer readable storage medium, and an electronic device.

The video frame image described in the present disclosure is, for example, any frame image in a video stream in a live classroom.

Specific embodiments of the present disclosure will be described in detail below with reference to the accompanying drawings.

Figure 2:
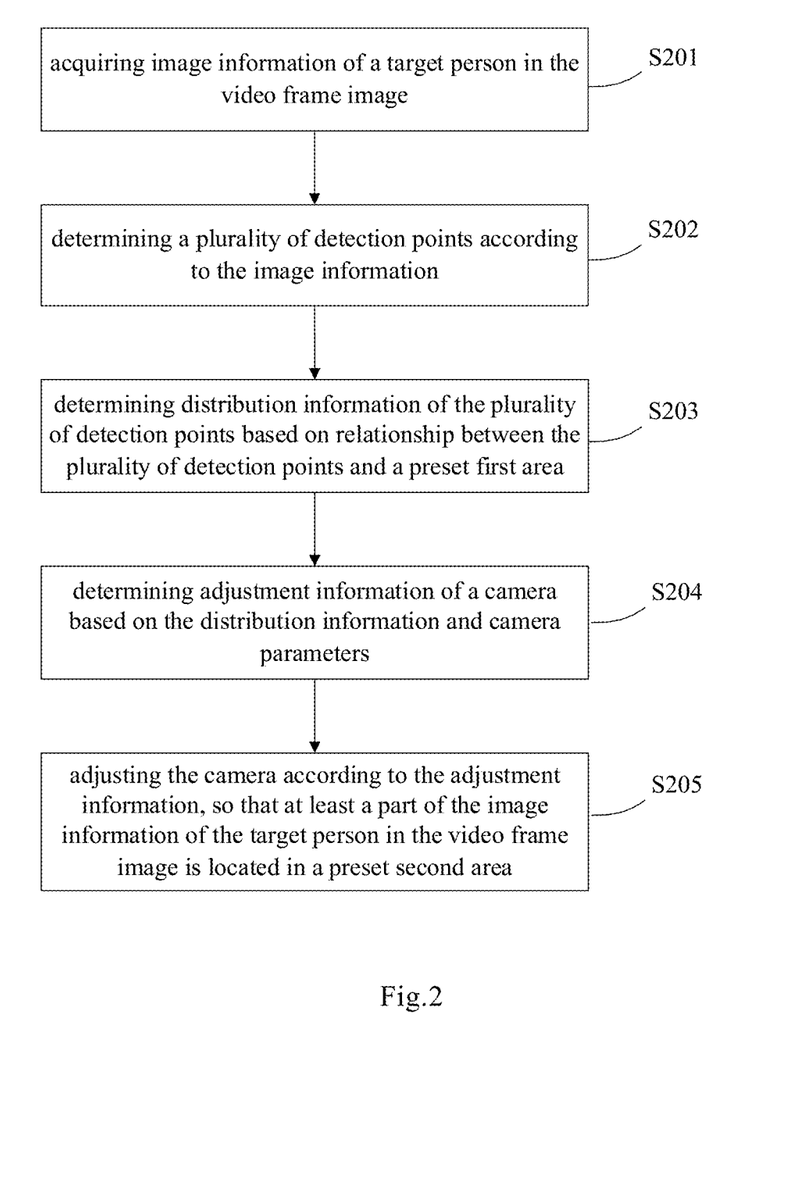
FIG. 2 shows a flowchart of a method for controlling a video frame image in a live classroom according to embodiments of the present disclosure.

FIG. 2 shows a flowchart of a method for controlling a video frame image in a live classroom according to embodiments of the present disclosure. In the live classroom in the embodiments of the present disclosure, a camera is used to photograph the teacher. However, the camera is controllable and can be adjusted according to changes in the position of the teacher in the live scene.

As shown in FIG. 2, the method for controlling a video frame image in a live classroom includes the following steps:

In step S201, image information 10 of a target person in a video frame image 100 is acquired.

The embodiments of the present disclosure are used to broadcast live classroom scenes, and a camera is used to live broadcast an activity process of a target person (for example, a teacher). The camera is controllable, and can realize automatic tracking according to changes in the position of the target person.

In the video frame image 100, there is image information 10 of the target person. The image information 10 may be whole body image information of the target person, or may be half image information of the target person.

A trained character recognition model can identify the image information of the target person from the video frame image.

The character recognition model can be obtained based on previous historical target person, for example, the character recognition model is trained using the historical target person information as a training sample. A process of performing character recognition on historical target person information according to the character recognition model is not described in detail in this embodiment, which can be implemented with reference to various implementation manners in related art.

In step S202, a plurality of detection points T are determined according to the image information.

The plurality of detection points are used to determine whether the image information meets a preset adjustment condition for the camera. Therefore, the plurality of detection points can represent posture characteristics of the target person represented by the image information.

Optionally, determining the plurality of detection points according to the image information includes the following steps:

In step S202-1, an image contour line 11 of the target person is acquired according to the image information.

The image contour line 11 of the target person can acquired from the image information through the Canny operator edge detection method.

In step S202-2, the plurality of detection points T are determined based on the image contour line.

The image contour line of the target person can fully express the posture characteristics of the target person. Therefore, selecting detection points on the image contour line of the target person ensures validity of the data, avoids redundant calculations, and improves control efficiency.

Further, determining the plurality of detection points based on the image contour line includes the following steps:

In step S202-2-1, intersections of the image contour line and a plurality of preset parallel lines PL are determined as the plurality of detection points T.

In some embodiments of the present disclosure, the plurality of preset parallel lines PL may extend in a predetermined direction, such as a horizontal direction. In other embodiments, the predetermined direction may also be other directions, such as a vertical direction.

Figure 3:
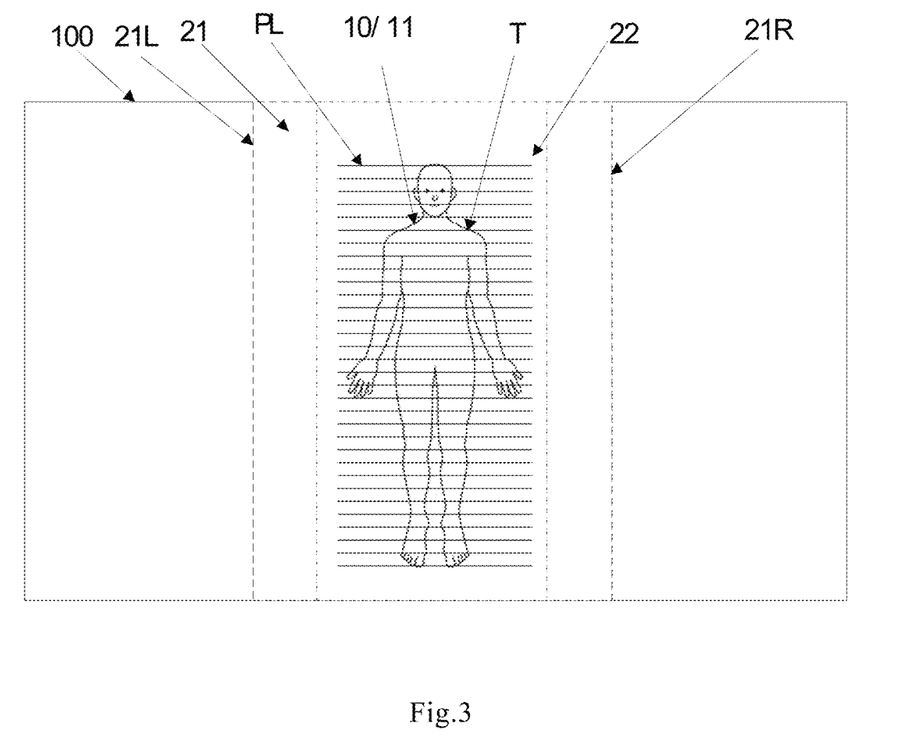
FIG. 3 shows a video frame image in a live classroom according to embodiments of the present disclosure, in which a plurality of detection points are all located in a first area.
Figure 4:
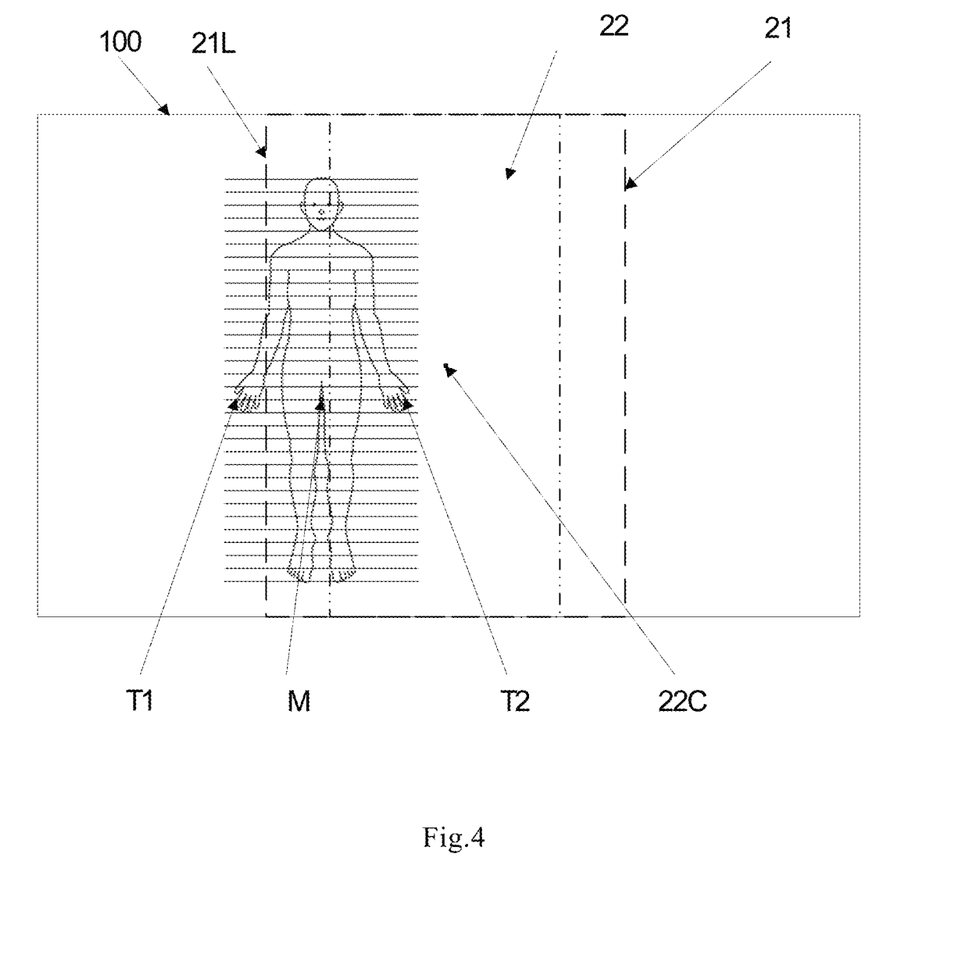
FIG. 4 shows a video frame image in a live classroom according to embodiments of the present disclosure, in which at least some detection points are located outside a first area.

As shown in FIGS. 3 and 4, the plurality of parallel lines PL may be parallel lines at equal distance, thereby simplifying the step of determining the detection points, thereby improving efficiency of adjusting the camera.

The plurality of parallel lines may also be parallel lines at unequal distance. Equidistant parallel lines with short spacing are set in important parts of the target person's image, and equidistant parallel lines with long spacing or no parallel lines are set in the non-important parts of the target person's image. The important parts refer to parts that can influence the image of the target person to be adjusted by the camera. For example, head information of the teacher's image is the focus of the students' attention, and the teacher's feet determine the position of the teacher in the classroom, which are the basis for judging whether the teacher's position has moved, so that the head information and/or feet information of the teacher's image can be determined as important part information. Therefore, equidistant parallel lines with short spacing are set at the head information and/or feet information of the teacher's image. Setting equidistant parallel lines with short spacing in important parts of the target person's image improves collection density and number of detection points of important parts. The detection points determined thereby are more representative and can effectively determine the shooting angle suitable for a vision habit of a user.

In step S203, distribution information of the plurality of detection points T is determined based on relationship between the plurality of detection points and a preset first area 21.

As shown in FIGS. 3 and 4, the preset first area 21 is set in the video frame image 100 for positioning and dividing the detection points, and the detection points outside the first area are used as the basis for adjusting the camera. A height of the first area 21 is higher than or equal to a height of the video frame image. For example, the height of the first area 21 is the same as the height of the video frame image. The purpose of setting the first area 21 is to ensure that the image information 10 of the target person has an adjustment redundancy suitable for the user's habits in the video frame image 100, and avoid visual discomfort caused by frequent camera adjustments.

The embodiments of the present disclosure may divide the plurality of detection points T based on the first area 21. The plurality of detection points include detection points located on the left side of the first area in the horizontal direction, detection points located on the right side of the first area in the horizontal direction, and detection points located in the first area.

As shown in FIGS. 3 and 4, the detection points located on the left side of the first area 21 in the horizontal direction refer to the detection points located on the left side of a left vertical boundary line 21L of the first area 21. The detection points located on the right side of the first area 21 in the horizontal direction refer to the detection points located on the right side of a right vertical boundary line 21R of the first area 21. The detection points located in the first area 21 refer to the detection points located between the left vertical boundary line 21L and the right vertical boundary line 21R of the first area.

The distribution information of the plurality of detection points includes the number of the detection points located in different areas and a position of each detection point. For example, the distribution information may include the first number of the detection points located on the left side of the first area in the horizontal direction, and the second number of the detection points located on the right side of the first area in the horizontal direction.

Determining the distribution information of the detection points outside the first area based on the relationship between the detection points and the preset first area may specifically include: counting the first number of the detection points located on the left side of the first area in the horizontal direction, and counting the second number of the detection points located on the right side of the second area in the horizontal direction. Each of the first number and the second number may be 0 or a positive integer.

In step S204, adjustment information of the camera is determined based on the distribution information and camera parameters.

The adjustment information includes an adjustment direction and an adjustment angle.

The adjustment direction includes a left-side direction and a right-side direction. That is, the camera can be adjusted to the left and the right at a current position. The adjustment angle refers to an angle value of rotation of the camera in the horizontal direction. When the camera is not adjusted, the adjustment angle is 0.

In some embodiments, determining the adjustment information of the camera based on the distribution information and the camera parameters specifically includes:

In step S204-1, the first number and the second number is compared to determine the adjustment direction.

Specifically, it includes the following steps:

in step S204-1-1, in response to the first number being greater than the second number, and difference between the first number and the second number being greater than a preset adjustment threshold, it is determined that the adjustment direction is the left-side direction.

Herein, the adjustment threshold is greater than 0.

The purpose of setting the adjustment threshold in the embodiments of the present disclosure is to reduce unnecessary adjustments. When the first number and the second number are slightly out of balance, that is, when the difference between the first number and the second number is less than or equal to the preset adjustment threshold, the camera is not adjusted to avoid discomfort for the user caused by frequently adjusting the camera.

For example, the number of detection points that exceed the left vertical boundary line of the first area is 100, that is, the first number of detection points located on the left side of the first area is 100; the number of detection points that exceed the right vertical boundary line of the first area is 70, that is, the second number of detection points located on the right side of the first area is 70; then the difference between the first number and the second number is 30; if the preset adjustment threshold is 20, it is determined that the adjustment direction is the left-side direction; if the preset adjustment threshold is 40, the camera is not adjusted.

In step S204-1-2, in response to the first number being less than the second number, and the difference between the second number and the first number being greater than the adjustment threshold, it is determined that the adjustment direction is the right-side direction.

For example, the number of detection points that exceed the right vertical boundary line of the first area is 100, that is, the second number of detection points located on the right side of the first area is 100; the number of detection points that exceed the left vertical boundary line of the first area is 70, that is, the first number of detection points located on the left side of the first area is 70; then the difference between the second number and the first number is 30; if the preset adjustment threshold is 20, it is determined that the adjustment direction is the right-side direction; if the preset adjustment threshold is 40, the camera is not adjusted.

The distribution information in step S204 may further include a position of a first specific detection point T1 and a position of a second specific detection point T2, where the first specific detection point T1 is the leftmost detection point in the horizontal direction among the plurality of detection points, and the second specific detection point T2 is the rightmost detection point in the horizontal direction among the plurality of detection points.

In some embodiments, determining the adjustment information of the camera based on the distribution information and camera parameters further includes:

In step S204-2, an adjustment angle is determined based on the distribution information and the camera parameters, for example, an angle of view of the camera in the horizontal direction.

Specifically, as shown in FIG. 4, step S204-2 includes the following steps:

In step S204-2-1, an intermediate position between the first specific detection point T1 and the second specific detection point T2 in the video frame image is acquired, and a distance between the intermediate position and the first specific detection point in the horizontal direction is equal to a distance between the intermediate position and the second specific detection point in the horizontal direction.

The two specific detection points, that is, the first specific detection point T1 and the second specific detection point T2 are respectively located at both ends of all the detection points in the horizontal direction. It can be understood that the two specific detection points are the two detection points with the largest distance in the horizontal direction among all the detection points. As shown in FIG. 4, if all the detection points are located in a coordinate system, horizontal coordinate values of the two specific detection points are respectively the maximum and minimum values among the horizontal coordinate values of all the detection points.

A horizontal coordinate of the intermediate position M is an average value of the horizontal coordinate values of the two specific detection points, and a vertical coordinate of the intermediate position is an average value of the vertical coordinate values of the two specific detection points.

In step S204-2-2, a first distance D in the horizontal direction between a center position 22C of the preset second area and the intermediate position M is calculated, which is also called as a horizontal distance D between the center position 22C of the second area and the intermediate position M.

As shown in FIG. 4, the horizontal distance D between the center position 22C of the second area and the intermediate position M can be understood as difference between the horizontal coordinate of the center position 22C and the horizontal coordinate of the intermediate position M in a coordinate system.

In step S204-2-3: The adjustment angle is acquired based on the first distance D, a width d of the video frame image 100, and camera parameters.

Figure 5:
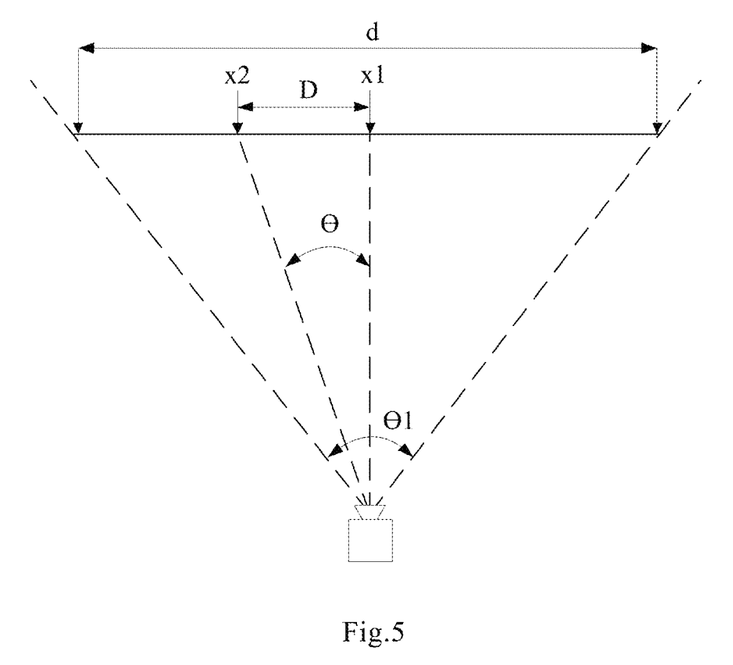
FIG. 5 shows a principle diagram of adjusting an angle in a method for controlling a video frame image in a live classroom according to embodiments of the present disclosure.

For example, as shown in FIG. 5, the adjustment direction is the left-side direction, the center position of the second area is (x1, y1), and the intermediate position is (x2, y2), then the horizontal distance D=|x2−x1|. The resolution of the video frame image is 1080P, the width of the video frame image is d=1920 pixels, and the camera parameters include the camera's horizontal viewing angle Θ1, then the adjustment angle Θ=a tan(2×D×tan(Θ1/2)/d.

In step S205, the camera is adjusted according to the adjustment information so that at least a part of the image information of the target person in the video frame image is located in a preset second area, wherein the second area is located within the first area.

Herein, the second area 22 is located within the first area 21.

In some embodiments, the center position of the first region 21 is located at a center position of the video frame image 100.

In some embodiments, the center position 22C of the second area 22 is located at the center position of the video frame image 100. In the embodiments of the present disclosure, the sensitivity of the camera is adjusted by controlling the width of the first area. When the width of the first area is equal to 0, that is, the vertical boundary lines on the left and right sides of the first area coincide. This situation makes the camera adjustment sensitivity the highest. When the width of the first area is equal to that of the video frame image, that is, the vertical boundary lines on the left and right sides of the first area coincide with the two boundary lines of the video frame image, respectively. This situation makes the camera adjustment sensitivity the lowest. In order to avoid frequent adjustments to the camera and make the image information of the target person conform to the user's visual habits, the vertical boundary line on the left side of the first area is set between ⅛ and ⅜ of the width of the video frame image from the left, and the vertical boundary line on the right side of the area is set between ⅝ and ⅞ of the width of the video frame image from the left. For example, if the width of the video frame image is equal to 1920 pixels, the vertical boundary line on the left side of the first area is set between 240 and 720 pixels from the left of width of the video frame image, and the vertical boundary line on the right side of the first area is set between 1200 and 1680 pixels from the left of the width of the video frame image.

In the embodiments of the present disclosure, a plurality of detection points are set in the image information of the target person in the video frame image, and the distribution information of the plurality of detection points is determined through relationship between the detection points and the preset first area, and then the distribution information of the plurality of detection points is determined through the distribution information of the detection points and camera parameter adjustment information. This ensures that the image information of the target person has an adjustment redundancy suitable for the user's habits in the video frame image, and avoids visual discomfort caused by frequent camera adjustments.

Corresponding to above-mentioned embodiments provided by the present disclosure, the present disclosure also provides other embodiments, namely, an apparatus for controlling a video frame image in a live classroom. Since these embodiments are basically similar to the foregoing embodiments, the description is relatively simple. For related parts, please refer to the corresponding descriptions of the foregoing embodiments. The apparatus embodiments described below are merely illustrative.

Figure 6:
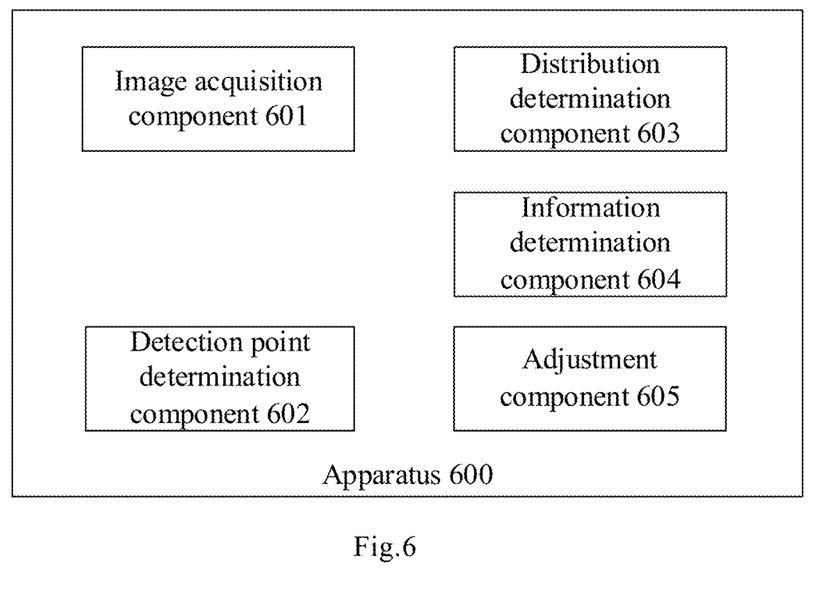
FIG. 6 shows a block diagram of an apparatus for controlling a video frame image in a live classroom according to embodiments of the present disclosure.

FIG. 6 shows an apparatus for controlling a video frame image in a live classroom provided by embodiments of the present disclosure.

As shown in FIG. 6, an apparatus 600 for controlling a video frame image in a live classroom provided by the embodiments of the present disclosure includes:

an image acquisition component 601 is configured to acquire image information of a target person in a video frame image;

a detection point determination component 602 is configured to determine a plurality of detection points according to the image information;

a distribution determination component 603 is configured to determine distribution information of the plurality of detection points based on relationship between the detection points and a preset first area;

an information determination component 604 is configured to determine adjustment information of a camera based on the distribution information and camera parameters; and an adjustment component 605 is configured to adjust the camera according to the adjustment information so that at least a part of the image information of the target person in the video frame image is located in a preset second area, where the second area is located within the first area.

Optionally, the detection point determination component 602 is specifically configured to:

acquire an image contour line of the target person according to the image information;

determine the plurality of detection points based on the image contour line.

Optionally, determining the detection points based on the image contour line specifically includes:

determining intersections of the image contour line and a plurality of preset parallel lines as the plurality of detection points.

Optionally, the distribution information includes the number of detection points located in different regions and a position of each detection point.

The adjustment information includes an adjustment direction.

The information determination component 604 is configured to:

compare the first number and the second number to determine the adjustment direction;

optionally, comparing the first number and the second number to determine the adjustment direction includes:

in response to the first number being greater than the second number, and the difference between the first number and the second number being greater than a preset adjustment threshold, it is determined that the adjustment direction is the left-side direction, wherein the adjustment threshold is greater than 0;

in response to the first number being less than the second number, and the difference between the second number and the first number being greater than the adjustment threshold, it is determined that the adjustment direction is the right-side direction.

Optionally, the distribution information further includes a position of a first specific detection point and a position of a second specific detection point, where the first specific detection point is the leftmost detection point in the horizontal direction among the plurality of detection points, and the second specific detection point is the rightmost detection point in the horizontal direction among the plurality of detection points, the adjustment information further includes an adjustment angle, and the camera parameters include the angle of view of the camera in the horizontal direction.

Determining the adjustment information of the camera based on the distribution information and camera parameters includes:

acquiring an intermediate position between the first specific detection point T1 and the second specific detection point T2 in the video frame image, and a distance between the intermediate position and the first specific detection point in the horizontal direction is equal to a distance between the intermediate position and the second specific detection point in the horizontal direction;

calculating a first distance in the horizontal direction between a center position of the preset second area and the intermediate position;

acquiring the adjustment angle based on the first distance, a width of the video frame image, and camera parameters.

Optionally, a center position of at least one of the first area and the second area is located at the center position of the video frame image. In the embodiments of the present disclosure, a plurality of detection points are set in the image information of the target person in the video frame image, and the distribution information of the plurality of detection points is determined through relationship between the detection points and the preset first area, and then the distribution information of the plurality of detection points is determined through the distribution information of the detection points and camera parameter adjustment information. This ensures that the image information of the target person has an adjustment redundancy suitable for the user's habits in the video frame image, and avoids visual discomfort caused by frequent camera adjustments.

Some embodiments of the present disclosure provide an electronic device, which is used for a method for controlling a video frame image in a live classroom. The electronic device includes: at least one processor; and a memory communicatively connected to the at least one processor.

Herein, the memory stores instructions that can be executed by the one processor, and the instructions are executed by the at least one processor, so that the at least one processor can perform the method for controlling the video frame image in the live classroom as described above.

The embodiments provided in the present disclosure provide a computer storage medium that stores computer-executable instructions, and the computer-executable instructions can execute the aforementioned method for controlling a video frame image in a live classroom.

Figure 7:
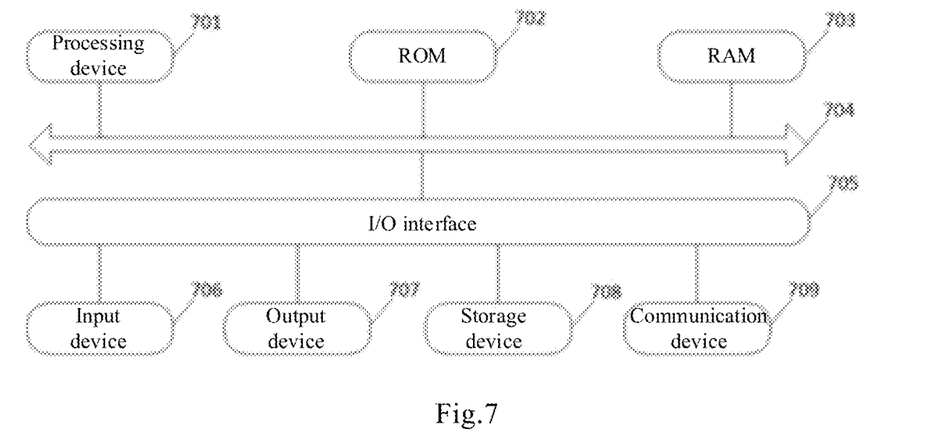
FIG. 7 shows a structural block diagram of an electronic device according to embodiments of the present disclosure.

Referring to FIG. 7, it shows a schematic structural diagram of an electronic device suitable for implementing the embodiments of the present disclosure. The terminal device in the embodiments of the present disclosure may include, but are not limited to, mobile phones, notebook computers, digital broadcast receivers, PDAs (personal digital assistants), PADs (tablet computers), PMPs (portable multimedia players), vehicle-mounted terminals (such as vehicle-mounted navigation terminals) and other mobile terminals and fixed terminals such as digital TVs, desktop computers, etc. The electronic device shown in FIG. 7 is only an example, and should not bring any limitation to the function and scope of use of the embodiments of the present disclosure.

As shown in FIG. 7, the electronic device may include a processing device (such as a central processing unit, a graphics processor, etc.) 701, which may perform various appropriate actions and processing according to programs stored in a read-only memory (ROM) 702 or programs loaded from a storage device 708 into a random access memory (RAM) 703. In the RAM 703, various programs and data required for the operation of the electronic device are also stored. The processing device 701, the ROM 702, and the RANI 703 are connected to each other through a bus 704. An input/output (I/O) interface 705 is also connected to the bus 704.

Generally, the following devices can be connected to the I/O interface 705: including an input device 706 such as a touch screen, a touch pad, a keyboard, a mouse, a camera, a microphone, an accelerometer, a gyroscope, etc., an output device 707 such as a liquid crystal display (LCD), a speaker, a vibration, etc., a storage device 708 such as a magnetic tape, a hard disk, etc., and a communication device 709 which may allow the electronic device to perform wireless or wired communication with other devices to exchange data. Although FIG. 7 shows an electronic device with various devices, it should be understood that it is not required to implement or have all of the illustrated devices. It may alternatively be implemented or provided with more or fewer devices.

In particular, according to embodiments of the present disclosure, the process described above with reference to the flowchart can be implemented as a computer software program. For example, embodiments of the present disclosure include a computer program product, which includes computer programs carried on a non-transitory computer readable medium, and the computer programs contain program codes for executing the method shown in the flowchart. In such embodiments, the computer programs may be downloaded and installed from the network through the communication device 709, or installed from the storage device 708, or installed from the ROM 702. When the computer program is executed by the processing device 701, it executes the above-mentioned functions defined in the method of the embodiment of the present disclosure.

It should be noted that the computer readable medium mentioned above in the present disclosure may be a computer readable signal medium or a computer readable storage medium, or any combination of the two. The computer readable storage medium may be, for example, but not limited to, electrical, a magnetic, optical, electromagnetic, infrared, or semiconductor system, apparatus, or device, or a combination of any of the above. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that contains or stores a program, and the program may be used by or in combination with an instruction execution system, apparatus, or device. In the present disclosure, a computer readable signal medium may include a data signal propagated in a baseband or as a part of a carrier wave, and a computer readable program code is carried therein. This propagated data signal can take many forms, including but not limited to electromagnetic signals, optical signals, or any suitable combination of the above. The computer readable signal medium may also be any computer readable medium other than the computer readable storage medium. The computer readable signal medium may send, propagate, or transmit the program for use by or in combination with the instruction execution system, apparatus, or device. The program code carried on the computer readable medium can be transmitted by any suitable medium, including but not limited to wire, optical cable, RF (Radio Frequency), etc., or any suitable combination of the above.

In some embodiments, a client and a server can communicate with any currently known or future-developed network protocol such as HTTP (Hyper Text Transfer Protocol), and can communicate and connect with digital data in any form or medium (for example, communication network). Examples of communication networks include local area networks ("LAN"), wide area networks ("WAN"), networks of network (for example, the Internet), and end-to-end networks (for example, ad hoc end-to-end networks), as well as any currently known or future-developed network.

The computer readable medium mentioned above may be included in the electronic device mentioned above, or it may exist alone without being assembled into the electronic device.

The computer program code for performing the operations of the present disclosure can be written in one or more programming languages or a combination thereof. The programming languages mentioned above include but are not limited to object-oriented programming languages such as Java, Smalltalk, C++, and also including conventional procedural programming languages such as "C" language or similar programming languages. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider and connecting through the Internet).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved in the embodiments described in the present disclosure may be implemented in a software manner, and may also be implemented in a hardware manner. Among them, the name of the unit does not constitute a limitation on the unit itself under certain circumstances.

The functions described hereinabove may be performed at least in part by one or more hardware logic components. For example, without limitation, exemplary types of hardware logic components that can be used include, Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine readable medium may be a tangible medium, which may contain or store a program for use by the instruction execution system, apparatus, or device or in combination with the instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of machine readable storage media would include electrical connections based on one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

The above description is only a preferred embodiment of the present disclosure and an explanation of technical principles applied. Those skilled in the art should understand that the scope of disclosure involved in this disclosure is not limited to the technical solutions formed by the specific combination of the above technical features, and should also cover the above technical features or technical solutions without departing from the above disclosed concept. Other technical solutions formed by arbitrarily combining the equivalent features. For example, the features mentioned above and the technical features disclosed in the present disclosure (but not limited to) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for controlling a video frame image in a live classroom, comprising:
    acquiring image information of a target person in the video frame image;
    determining a plurality of detection points according to the image information, the plurality of detection points representing posture characteristics of the target person;
    determining distribution information of the plurality of detection points based on relationship between the plurality of detection points and a preset first area;
    determining adjustment information of a camera based on the distribution information and camera parameters; and
    adjusting the camera according to the adjustment information, so that at least a part of the image information of the target person in the video frame image is located in a preset second area, wherein the preset second area is located in the preset first area,
    wherein, the distribution information comprises a first number of the detection points located on the left side of the preset first area in a horizontal direction, and a second number of the detection points located on the right side of the preset first area in the horizontal direction;
    the adjustment information comprises an adjustment direction; and
    the determining adjustment information of the camera based on the distribution information and camera parameters comprises:
    comparing the first number of the detection points and the second number of the detection points to determine the adjustment direction,
    wherein the comparing the first number and the second number to determine the adjustment direction comprises:
    in response to the first number being greater than the second number, and difference between the first number and the second number being greater than a preset adjustment threshold, it is determined that the adjustment direction is a left-side direction, wherein the adjustment threshold is greater than 0; and
    in response to the first number being less than the second number, and difference between the second number and the first number being greater than the adjustment threshold, it is determined that the adjustment direction is a right-side direction.

2. The method of claim 1, wherein the determining a plurality of detection points according to the image information comprises:
    acquiring an image contour line of the target person according to the image information; and
    determining the plurality of detection points based on the image contour line.

3. The method of claim 2, wherein the determining the plurality of detection points based on the image contour line comprises:
    determining intersections of the image contour line and a plurality of parallel lines as the plurality of detection points, wherein the plurality of parallel lines are preset.

4. The method of claim 1, wherein the distribution information further comprises a position of a first specific detection point and a position of a second specific detection point, wherein the first specific detection point is the leftmost detection point in the horizontal direction among the plurality of detection points, the second specific detection point is the rightmost detection point in the horizontal direction among the plurality of detection points, and the adjustment information further comprises an adjustment angle of the camera, and the camera parameters comprise an angle of view of the camera in the horizontal direction;
    the determining adjustment information of the camera based on the distribution information and camera parameters comprises:
    acquiring an intermediate position between the first specific detection point and the second specific detection point in the video frame image, wherein a distance between the intermediate position and the first specific detection point in the horizontal direction is equal to a distance between the intermediate position and the second specific detection point in the horizontal direction;
    calculating a first distance between a center position of the second area and the intermediate position in the horizontal direction; and
    acquiring the adjustment angle based on the first distance, a width of the video frame image, and the angle of view of the camera in the horizontal direction.

5. The method of claim 1, wherein a center position of at least one of the first area and the second area is located at a center position of the video frame image.

6. An apparatus for controlling a video frame image in a live classroom, comprising circuitry configured to:
    acquire image information of a target person in the video frame image;
    determine a plurality of detection points according to the image information, the plurality of detection points representing posture characteristics of the target person;
    determine distribution information of the plurality of detection points based on relationship between the plurality of detection points and a preset first area;
    determine adjustment information of a camera based on the distribution information and camera parameters; and adjust the camera according to the adjustment information, so that at least a part of the image information of the target person in the video frame image is located in a preset second area, wherein the second area is located in the first area, wherein, the distribution information comprises a first number of the detection points located on the left side of the first area in a horizontal direction, and a second number of the detection points located on the right side of the first area in the horizontal direction;

the adjustment information comprises an adjustment direction; and the circuitry configured to compare the first number and the second number to determine the adjustment direction, in response to the first number being greater than the second number, and difference between the first number and the second number being greater than a preset adjustment threshold, it is determined that the adjustment direction is a left-side direction, wherein the adjustment threshold is greater than 0; and in response to the first number being less than the second number, and difference between the second number and the first number being greater than the adjustment threshold, it is determined that the adjustment direction is a right-side direction.

7. A non-transitory computer readable storage medium having a computer program stored thereon, wherein the program is executed by a processor to implement the method according to claim 1.

8. An electronic device, comprising:

one or more processors;

a storage device configured to store one or more programs, and when the one or more programs are executed by the one or more processors, the one or more processors implement the method according to claim 1.

* * * * *